United States Patent
Turcotte et al.

(10) Patent No.: US 9,540,558 B2
(45) Date of Patent: Jan. 10, 2017

(54) EXTENDED OPERATION ENGINE COOLANT COMPOSITION

(71) Applicant: Ashland Licensing and Intellectual Property LLC, Dublin, OH (US)

(72) Inventors: David E. Turcotte, Lexington, KY (US); Ladislaus Meszaros, Mutterstadt (DE); David F. Embaugh, Lancaster, KY (US); Gefei Wu, Lexington, KY (US)

(73) Assignee: Ashland Licensing and Intellectual Property, LLC, Lexington, KY (US)

( * ) Notice: Subject to any disclaimer, the term of this patent is extended or adjusted under 35 U.S.C. 154(b) by 0 days.

(21) Appl. No.: 14/973,249

(22) Filed: Dec. 17, 2015

(65) Prior Publication Data

US 2016/0102234 A1 Apr. 14, 2016

Related U.S. Application Data

(63) Continuation-in-part of application No. 13/916,141, filed on Jun. 12, 2013, now Pat. No. 9,328,278.

(51) Int. Cl.
  C09K 5/20 (2006.01)
  C09K 5/10 (2006.01)
  C23F 11/08 (2006.01)
  C23F 11/12 (2006.01)

(52) U.S. Cl.
  CPC . *C09K 5/10* (2013.01); *C09K 5/20* (2013.01); *C23F 11/08* (2013.01); *C23F 11/126* (2013.01)

(58) Field of Classification Search
  None
  See application file for complete search history.

(56) References Cited

U.S. PATENT DOCUMENTS

| | | | |
|---|---|---|---|
| 3,198,820 A | 8/1965 | Pines et al. | |
| 3,337,496 A | 8/1967 | Pines et al. | |
| 3,341,469 A | 9/1967 | Pines et al. | |
| 4,209,415 A | 6/1980 | Hirozawa et al. | |
| 4,210,548 A | 7/1980 | Hirozawa et al. | |
| 4,210,549 A | 7/1980 | Hirozawa et al. | |
| 4,234,440 A | 11/1980 | Hirozawa et al. | |
| 4,241,011 A | 12/1980 | Hirozawa et al. | |
| 4,241,012 A | 12/1980 | Hirozawa et al. | |
| 4,241,013 A | 12/1980 | Hirozawa et al. | |
| 4,241,014 A | 12/1980 | Hirozawa et al. | |
| 4,241,015 A | 12/1980 | Hirozawa et al. | |
| 4,241,016 A | 12/1980 | Hirozawa et al. | |
| 4,324,675 A | 4/1982 | Barthold et al. | |
| 4,647,392 A | 3/1987 | Darden et al. | |
| 4,719,084 A | 1/1988 | Schmid et al. | |
| 4,810,404 A | 3/1989 | Gousetis et al. | |
| 4,898,687 A | 2/1990 | Parker et al. | |
| 5,062,987 A | 11/1991 | Turcotte et al. | |
| 5,064,552 A | 11/1991 | Oppenlaender et al. | |
| 5,071,582 A | 12/1991 | Conville et al. | |
| 5,262,078 A | 11/1993 | Hirozawa et al. | |
| 5,266,228 A | 11/1993 | Hirozawa et al. | |
| 5,288,419 A | 2/1994 | Turcotte et al. | |
| 5,330,670 A | 7/1994 | Turcotte et al. | |
| 5,702,631 A | 12/1997 | Conville et al. | |
| 6,080,331 A | 6/2000 | Meszaros et al. | |
| 6,126,852 A | 10/2000 | Turcotte et al. | |
| 6,228,283 B1 | 5/2001 | Turcotte et al. | |
| 6,309,559 B1 | 10/2001 | Minks et al. | |
| 6,413,445 B1 | 7/2002 | Oppenlander et al. | |
| 6,540,934 B2 | 4/2003 | Sapienza et al. | |
| 6,818,147 B2 | 11/2004 | Wenderoth et al. | |
| 7,387,748 B2 | 6/2008 | Pellet et al. | |
| 7,407,599 B2 | 8/2008 | Turcotte et al. | |
| 7,588,695 B2 | 9/2009 | Wenderoth et al. | |
| 7,704,406 B2 | 4/2010 | Wenderoth et al. | |
| 7,790,054 B2 | 9/2010 | Lievens et al. | |
| 8,062,545 B2 | 11/2011 | Lievens et al. | |
| 8,202,444 B2 | 6/2012 | Wenderoth et al. | |
| 8,333,904 B2 | 12/2012 | Wenderoth et al. | |
| 8,454,854 B2 | 6/2013 | Kormann et al. | |
| 8,865,016 B2 | 10/2014 | Waidelich et al. | |
| 9,080,093 B2 | 7/2015 | Dietl et al. | |
| 2004/0075077 A1 | 4/2004 | Maes | |
| 2006/0033076 A1 | 2/2006 | Hafner et al. | |

(Continued)

FOREIGN PATENT DOCUMENTS

| | | |
|---|---|---|
| AU | 758142 B2 | 3/2003 |
| CA | 2307621 A1 | 4/1999 |

(Continued)

OTHER PUBLICATIONS

T.W. Weir and P. Van de Ven, Review of Organic Acids as Inhibitors in Engine Coolants, SAE International, Feb. 26-29, 1996, 13 pages, International Congress & Exposition, Detroit, Michigan, USA.

Viswanathan S. Saji, Contemporary Developments in Corrosion Inhibitors—Review of Patents, Recent Patents on corrosion Science, Apr. 6, 2011, 9 pages, vol. 1, Issue 1, Bentham Science Publishers, Sharjah, United Arab Emirates.

Viswanathan S. Saji, A Review on Recent Patents in Corrosion Inhibitors, Recent Patents on Corrosion Science, 2010, 7 pages, vol. 2, Bentham Open, Sharjah, United Arab Emirates.

The Industrial Chemist, Feb. 1954, 2 pages.

(Continued)

*Primary Examiner* — Necholus Ogden, Jr.
(74) *Attorney, Agent, or Firm* — Wood Herron & Evans LLP

(57) ABSTRACT

The invention relates to an engine coolant composition, and a method of increasing the operational life of a coolant composition in an engine, wherein an isononanoic acid is incorporated into the generally glycol based coolant fluid in place of nitrous acid or its salt to reduce pitting corrosion on iron containing surfaces, and one or more hydroxybenzoic acids are incorporated.

27 Claims, No Drawings

(56) References Cited

U.S. PATENT DOCUMENTS

| | | | |
|---|---|---|---|
| 2007/0034825 A1* | 2/2007 | Wenderoth | C09K 5/20 252/70 |
| 2008/0149883 A1* | 6/2008 | Kormann | C09K 5/10 252/75 |
| 2009/0250654 A1* | 10/2009 | Lievens | C09K 3/185 252/75 |
| 2010/0283002 A1 | 11/2010 | Lievens et al. | |
| 2011/0006250 A1 | 1/2011 | Lievens et al. | |
| 2014/0224193 A1 | 8/2014 | Dietl et al. | |
| 2015/0203735 A1 | 7/2015 | Dietl et al. | |

FOREIGN PATENT DOCUMENTS

| | | |
|---|---|---|
| CA | 2691225 A1 | 1/2009 |
| DE | 19707733 A1 | 11/1997 |
| EP | 0479470 A1 | 4/1992 |
| EP | 0816467 A1 | 1/1998 |
| GB | 1004259 A | 9/1965 |
| WO | 2010138273 A2 | 12/2010 |

OTHER PUBLICATIONS

International Searching Authority, International Search Report and Written Opinion issued in International Application No. PCT/US2014/041527, Aug. 25, 2014, 11 pages.

* cited by examiner

EXTENDED OPERATION ENGINE COOLANT COMPOSITION

CROSS-REFERENCE TO RELATED APPLICATION

This application claims the benefit of and priority to prior filed pending Non-Provisional application Ser. No. 13/916,141, filed Jun. 12, 2013, which is expressly incorporated herein by reference.

FIELD OF THE INVENTION

The invention relates generally to engine coolant compositions with extended operational activity, and a method for increasing the operational life of a coolant composition in the engine.

BACKGROUND OF THE INVENTION

A coolant composition introduced into the cooling system for a diesel engine is intended to reproducibly carry heat from heat generating components within the engine to a cooling portion within the system, and then to be recycled continuously through the engine during operation. The coolant composition optimally is not affected by the high temperature encountered within the cooling system, nor is it chemically modified as a result of being cycled through the system. Further, the coolant composition assists in protecting metal parts from corrosion effects which would be encountered in the cooling system environment when the engine is not operating.

The coolant composition thus has to carry out a number of functions within the cooling system to perform satisfactorily. It must have a sufficiently high thermal conductivity to be able to absorb heat, but be sufficiently stable so as to not decompose or otherwise change in chemical composition during engine operation. Further, because the interior of the cooling system contains metal components of differing compositions such as iron, brass, solder, aluminum, and steel, the coolant must be both unaffected by the metals and able to protect the metals in this environment from degradation. Further, the coolant composition must be able to provide its heat absorbing and protective function over an extended period of time.

Glycols have long been used in coolant compositions as the primary coolant and freezing point depressant component. Depending on the temperature range of the internal environment in which the engine is to be operated, varying amounts of water may typically be added to extend the coolant composition. As a result the user is able to dilute the coolant composition as needed to obtain the desired low and high temperature protection under the expected duty conditions. It should be noted, though, that the protection against corrosion of the internal parts of the cooling system is required over the entire range of dilution of the coolant composition.

Certain of the components in the coolant composition may also require concentration adjustment, composition adjustment, or both, in response to the nature and quantity of the component metals used in the coolant system. Thus, engines which incorporate higher levels of aluminum-containing parts should utilize coolant compositions providing corrosion protection for aluminum components. Alternatively, where the cooling system incorporates primarily or exclusively iron and iron-containing metals, the corrosion protection components may differ in concentration, composition, or both, to optimize the coolant composition over its duty cycle for use with these metals.

In the case of cast iron cooling systems typically used in connection with diesel engines, pitting of the metal surface in contact with the coolant composition is a concern. In wet sleeved diesel engines, pitting of the engine cylinder liners is a primary concern. These engine liners are made of cast iron, and traditionally rely on the presence of sodium nitrite in the coolant composition to prevent or minimize pitting of the liner surface. In a coolant composition for use with diesel engines, the sodium nitrite is consumed as it protects the iron surfaces, often being oxidized to sodium nitrate. In addition, the sodium nitrite in the coolant composition tends to act aggressively on any aluminum or solder surfaces within the cooling system. As a result, the concentration of nitrite in the coolant composition must be carefully controlled to balance the protective effect on iron surfaces with the corrosive effects on the other system components. To evaluate if the nitrite concentration remains within defined limits for a particular coolant system application, coolant can be applied to commercially-available test strips. Representative test strip products are available as Acustrip® CTS-3 from Acustrip, P.O. Box 413, Mountain Lakes, N.J. 07046 or as Fleetguard® Coolant Test Strips from Cummins Filtration, 1200 Fleetguard Road, Cookeville, Tenn. 38506.

Even where the nitrite is properly balanced, depletion of this component is a function of time and temperature which varies with service life and the duty cycle of the engine. Though other components are introduced into the coolant composition to eliminate or minimize the corrosion effect on the various metal surfaces in the cooling system, the sodium nitrite component is generally unique in its capacity to control pitting on iron surfaces in the cooling system. As such, depletion of nitrite in the coolant composition can compromise the ability of the coolant composition to protect against corrosion.

Coolant compositions in an engine typically function under alkaline pH conditions. Normal operation of the engine can cause formation of acidic materials over time which can corrode the metal surfaces in the engine in contact with the coolant composition containing the acidic materials.

SUMMARY OF THE INVENTION

The present invention addresses the issue of nitrite depletion in the coolant composition by providing a coolant composition that includes isononanoic acid at a concentration effective to perform the corrosion inhibition function of nitrite in iron-containing cooling systems such as used in diesel engines. As a result, the nitrite, either as the acid or as an alkali metal, alkaline earth, or ammonium salt, typically as sodium nitrite, does not need to be incorporated into the coolant composition. The coolant composition of the invention utilizes at least 50% by weight of a glycol based coolant liquid, such as but not limited to ethylene glycol, propylene glycol, diethylene glycol, and combinations thereof. Additionally, glycol ethers may be used as the coolant liquid alone or in combination with the above glycols. The glycol ethers include the methyl, ethyl, propyl, and butyl ethers of ethylene glycol, and mixtures thereof. Glycerin may also be used as a coolant liquid. In another embodiment, the commercial coolant composition generally will contain from 55% to 95% by weight of one or more of the above glycol or glycol ether components. In another embodiment, the commercial coolant composition will contain from 70% to 95% by weight of one or more of the glycol or glycol ether components. In a preferred embodiment, the commercial coolant composition will contain from 85% to 95% by weight of one or more of the glycol or glycol ether components. Further, the coolant composition will include one or more buffer materials, particularly 2-hydroxybenzoic acid, 3-hydroxybenzoic acid, 4-hydroxybenzoic acid, 2,4-dihydroxybenzoic acid, 2,6-dihydroxybenzoic acid, or combinations of these buffer materials. Use of appropriate concentrations of the buffer material minimizes or even eliminates the need to introduce additional pH-adjusting compounds over the service life of the coolant composition. As a result, the service life can be extended.

Other components for the coolant composition for use in iron-containing cooling systems may include an aqueous solution of alkali metal, alkaline earth, or ammonium hydroxide, typically sodium hydroxide, potassium hydroxide or combinations thereof as a corrosion inhibitor; $C_5$-$C_{13}$ short chain dicarboxylic acids or their alkali metal, alkaline earth, or ammonium salts, as a corrosion inhibitor; and other corrosion inhibitors such as azoles, nitrates, silicates, molybdates, and phosphates, typically present as the alkali metal, alkaline earth, or ammonium salt, usually the sodium or potassium salt. Also, coolant composition additives such as dyes, bitterants and defoamers may be incorporated.

The coolant composition of the invention utilizes isononanoic acid as a replacement for sodium nitrite as an iron inhibitor in the coolant composition. Isononanoic acid provides excellent pitting protection in an iron-containing cooling system, such as is found in diesel engines, but in addition does not degrade nor is it consumed over time in the coolant system environment. As a result, compared to a composition containing sodium nitrite, the relative percentages of the coolant composition corrosion inhibitor components do not change nor do the corrosion inhibitors require balancing to the same extent, if at all. Further, the composition does not require periodic chemical analysis, such as by checking with test strips to evaluate nitrite levels with possible supplementation of nitrous acid or the alkali, alkaline earth, or ammonium salts thereof. In comparison, the need to supplement the isononanoic acid additive is minimized during the duty cycle of the coolant composition. Further, the composition containing isononanoic acid in place of sodium nitrite also provides protection against corrosion on the other metal surfaces in the cooling system, such as aluminum, brass, and solder. Further, isononanoic acid is generally considered to have a lower toxicity relative to sodium nitrite.

The coolant composition used in the engine becomes less able to control corrosion on internal metal surfaces as the pH of the composition in the engine decreases from an alkaline pH toward an acidic pH (less than 7). Maintaining an alkaline pH is desirable, and alkaline components such as alkali metal hydroxides and specifically sodium hydroxide, potassium hydroxide, or mixtures of these hydroxides are incorporated into the coolant composition, as exemplary materials.

To improve the consistency of the pH environment in the engine, a buffering material can be introduced. The buffer, also described as an acid-base buffer, operates to resist a change in the coolant system's pH as a result of reactions of coolant composition components occurring in the coolant system which tend to lower the pH toward, and even into, the acidic range.

It has been found that buffering of the coolant composition initially having an alkaline pH can be facilitated by incorporating one or a mixture of an organic basic pH buffer from the group of 2-hydroxybenzoic acid, 3-hydroxybenzoic acid, 4-hydroxybenzoic acid, 2,4-dihydroxybenzoic acid, and 2,6-dihydroxybenzoic acid.

Incorporating a buffer of one or more of the above-identified organic acids in sufficient amount serves to maintain the pH of the coolant concentrate above about 9 to about 11. In another embodiment, the pH is maintained above about 9.5 to about 10.5. Upon dilution of the coolant concentrate to prepare a coolant composition, the pH of the resultant composition would be approximately the same as the pH of the concentrate.

The use of one or more buffer materials in the coolant composition aids in creating and maintaining reserve alkalinity (RA) under the conditions found in the coolant system. According to ASTM D1121(-11), "reserve alkalinity" is the number of milliliters to the nearest 0.1 ml of 0.100 N hydrochloric acid (HCl) required for the titration to a pH of 5.5 of a 10-ml sample of an undiluted, unused coolant, antirust, or coolant additive, and unused or used solutions thereof.

In a coolant, components of the coolant composition in the presence of oxygen, exhaust gasses and heat tend to degrade the coolant by lowering the system pH and this facilitates the corrosion of metal surfaces in contact with the composition. Buffering of these acidic byproducts as they are formed reduces the risk of corrosion on those metal surfaces.

DETAILED DESCRIPTION OF THE INVENTION

In its broader aspects, the invention is directed to an engine coolant composition which is comprised of 50% or more by weight of glycol based coolant liquid, less than about 10% by weight of a first carboxyl component selected from the group consisting of aliphatic dibasic acids or their salts having from 5 to 13 carbons and mixtures thereof, less than about 10% by weight of isononanoic acid, and at least one inorganic acid or salt as a corrosion inhibitor which is selected from the group consisting of molybdates, phosphates, and combinations thereof, wherein the engine coolant composition excludes nitrous acids or the alkali metal, alkaline earth, or ammonium salts thereof. More particularly, the glycol-based coolant liquid is present in the engine coolant composition at a concentration by weight of about 55% to about 95% and preferably of about 70% to about 95% and more preferably about 85% to about 95%. Further, the first carboxyl component is present in a concentration by weight between about 0.1% and about 10%. In an alternative embodiment the first carboxyl component is present in a concentration by weight between about 0.1% to about 6%. In a preferred embodiment, the first carboxyl component is present in a concentration by weight between about 4% and about 6%. Further, the isononanoic acid is present in the engine coolant composition in a concentration by weight between about 0.01% and about 10%. In a preferred embodiment, the isononanoic acid is present in a concentration by weight between about 0.01% and about 1%. In a more preferred embodiment, the isononanoic acid is present in a concentration by weight between about 0.25% and about 1%.

The primary coolant liquid in the coolant composition is a glycol, typically ethylene glycol, propylene glycol, and diethylene glycol or mixtures thereof. Additionally, glycol ethers and glycerin may be used as the coolant liquid alone or in combination with the above glycols. The glycol ethers include the methyl, ethyl, propyl, and butyl ethers of ethylene glycol, and mixtures thereof. In addition, water is also present in the coolant composition. A minimum volume of water is present as a result of introducing, for example, sodium hydroxide or potassium hydroxide into the coolant composition in the form of a solution of the alkali metal, alkaline earth, or ammonium hydroxide for corrosion and pH control. If the coolant composition temperature range permits the incorporation of additional water as needed to extend the glycol and obtain the desired freezing point depression limit, the coolant liquid can be comprised of not only the above glycol and glycol ether materials, but also include water as a component.

The first carboxyl component in the engine coolant composition consists of aliphatic dibasic acids or their salts having from 5 to 13 carbons. Exemplary aliphatic dibasic acids include glutaric acid, adipic acid, pimelic acid, suberic acid, azelaic acid, sebacic acid, undecanedioic acid, and dodecanedioic acid. In a preferred embodiment, the first carboxyl component is at least one of adipic acid, sebacic acid, and dodecanedioic acid.

The isononanoic acid component provides protection against pitting on iron surfaces in a cooling system environment. In addition to this capability, the isononanoic acid, having a boiling point over 200° C., is therefore not likely to volatilize out of the cooling system environment during operation of the diesel engine. The relative stability of isononanoic acid to chemical modification also renders the material unlikely to degrade in the coolant system environment. Thus, though under the pH conditions of the coolant composition the acid may be present as a salt, typically the sodium or potassium salt, the material will remain in the cooling system at a concentration effective to reduce pitting in an engine during the service life of the coolant composition.

As used herein, isononanoic acid refers to one or more branched-chain aliphatic carboxylic acids with 9 carbon atoms. Embodiments of isononanoic acid used in the engine coolant composition may include 7-methyloctanoic acid (e.g., CAS Nos. 693-19-6 and 26896-18-4), 6,6-dimethylheptanoic acid (e.g., CAS No. 15898-92-7), 3,5,5-trimethylhexanoic acid (e.g., CAS No. 3302-10-1), 3,4,5-trimethylhexanoic acid, 2,5,5-trimethylhexanoic acid, 2,2,4,4-tetramethylpentanoic acid (e.g., CAS No. 3302-12-3) and combinations thereof. In an embodiment, isononanoic acid has as its main component greater than 90% of one of 7-methyloctanoic acid, 6,6-dimethylheptanoic acid, 3,5,5-trimethylhexanoic acid, 3,4,5-trimethylhexanoic acid, 2,5,5-trimethylhexanoic acid, and 2,2,4,4-tetramethylpentanoic acid. The balance of the isononanoic acid may include other nine carbon carboxylic acid isomers and minor amounts of one or more contaminants. In a preferred embodiment, the isononanoic acid has as its main component greater than 90% of 3,5,5-trimethylhexanoic acid and even more preferably, the main component is greater than 95% 3,5,5-trimethylhexanoic acid.

In addition to the isononanoic acid component, the composition may include additional metal corrosion inhibitors. In this environment such materials would primarily be iron corrosion inhibitors. The corrosion inhibitors include alkali metal, alkaline earth metal, and ammonium hydroxides such as sodium hydroxide and potassium hydroxide. Typically, these hydroxides are introduced to the composition as a 50% (weight/weight) solution in water and are provided in the final engine coolant composition at a concentration in a range of about 3% by weight to about 5% by weight of the 50% (weight/weight) solution in water. Generally enough hydroxide solution is used to generate an alkaline pH in the coolant composition.

Transition metal compounds are also used to inhibit corrosion in formulations of the present invention. The water-soluble transition metal compounds such as water soluble molybdate, which is preferred for use in the aqueous systems of the present invention, can be any salt of molybdic acid ($H_2MoO_4$) that is readily soluble in water. These include both alkali metal and alkaline earth metal molybdates as well as ammonium molybdate, all of which are referred to herein as "alkali molybdate." Examples of useful alkali and other molybdates are sodium molybdate, potassium molybdate, lithium molybdate, molybdenum trioxide, ammonium molybdates such as ammonium dimolybdate and ammonium heptamolybdate, heteropolymolybdates such as silicoheteropolymolybdates and phosphoroheteropolymolybdates, and mixtures thereof. Other compatible transition metal compounds may be used alone or in combination, including for example, compounds containing cobalt, cerium, mixtures thereof and the like, as well as tungstates and vanadates. In addition, any salt of these transition metal compounds may be used including those containing sodium, potassium, lithium, calcium, magnesium and the like. The most preferred transition metal compound is sodium molybdate. The transition metal compound is employed in the coolant composition in amounts so as to provide about 5 ppm to about 5000 ppm of the transition metal compound in the final engine coolant formulation.

Azole compounds are present in the formulation, in the form of a salt, to inhibit corrosion of yellow metal like copper and brass. Brass thermostats and radiator caps are common in automobile engines, as well as copper and brass radiators. In one embodiment, the azole compound comprises at least three nitrogen atoms. The hydrocarbyl triazole of the instant invention is preferably an aromatic triazole or alkyl-substituted aromatic triazole, preferably benzotriazole or tolyltriazole (typically a mixture of 4-methylbenzotriazole and 5-methylbenzotriazole). The preferred hydrocarbyl triazole is tolyltriazole. The azole compound providing protection for copper and brass from corrosion can be selected from among the water-soluble triazoles, pyrazoles, isooxazoles, isothiazoles, thiazoles, thiadiazoles, and the like. Generally, the alkali metal salts of the azole compounds are used. Specific preferred azole compounds include salts of 1,2,3-benzotriazole and 1,2,3-tolyltriazole, which will react with basic materials in the composition to form the azole salts.

It is contemplated that certain azoles such as sodium 2-mercaptobenzimidazole and sodium imidazole define substituted and unsubstituted azoles containing two nitrogen atoms which provide an active azole molecule to combine with hydrogen to provide a neutralizing or buffering capability when used with a carboxylic acid. The hydrocarbyl triazoles utilized in embodiments of the invention contain three nitrogen molecules and can be more substituted and thus less active than the two-nitrogen imidazole, and would therefore be less corrosive to engine components and seals. Salts of the selected less active and more stable azole compounds in the instant formulation are thus important as corrosion inhibitors for protecting yellow metal. In the coolant composition as used in the diesel engine, the azole component is present in a concentration from about 0.01% to about 10%, or alternatively from about 0.05% to about 1%, most narrowly from about 0.1% to about 0.5%, with all percentages by weight.

Incorporating an acidic buffer material into a concentrate of the coolant can be seen to alter the reserve alkalinity of the concentrate, as defined in ASTM D1121(-11). The coolant composition is used in the engine after the concentrate has been diluted, typically with water. The buffer concentration ranges identified herein refer to the buffer component concentration in the concentrate. To produce a coolant composition from concentrate, the concentrate typically comprises about 50% to about 25% of the final coolant composition. The buffer material in an embodiment is 4-hydroxybenzoic acid. In another embodiment, the buffer material is 2-hydroxybenzoic acid. In yet another embodiment, the buffer material is 3-hydroxybenzoic acid. In still another embodiment, the buffer material is 2,4-dihydroxybenzoic acid. In yet another embodiment, the buffer material is 2,6-dihydroxybenzoic acid. Both a single buffer material and combinations of buffer materials are contemplated for use in the coolant composition, typically prepared by diluting a concentrate of the coolant component materials.

The concentration of the buffer material is typically within the range of about 0.01 to about 3%, based on the weight of the coolant concentrate. The buffer material may also be present in the composition at a concentration of about 0.1 to about 2% based on the coolant concentrate weight. In another embodiment, the buffer material concentration may be present in the composition at a concentration of about 0.4 to about 1%, all concentrations being by weight.

In a coolant composition prepared by diluting the coolant concentrate, the buffer material will typically have a concentration in the range of about 0.0025 to about 1.5% by weight.

The engine coolant additive may optionally include a defoaming agent. Any suitable defoamer, well known in the art, is suitable for the present formulations. Suitable defoamers include, for example, an organomodified polydimethylsiloxane-containing polyalkylene glycol, siloxane polyalkylene oxide copolymer, and polyalkylene oxide. Such defoamers are commercially available as Silbreak® 320 (from Momentive Performance Materials, Inc., Friendly, W. Va., and identified as an organomodified polydimethylsiloxane), Plurafac® LF 224 (commercially available from BASF Corporation, Florham Park, N.J., and identified as a low foaming nonionic surfactant, including alkoxylated, predominantly unbranched fatty alcohols, containing higher alkene oxides alongside ethylene oxide), PLURONIC® L-61 non-ionic surfactant (commercially available from BASF Corporation, and identified as an ethylene oxide/propylene oxide block copolymer) or PATCOTE® 415 liquid defoamer (commercially available from Patco Specialty Chemicals Division, American Ingredients Company, Kansas City, Mo., and identified as a non-silicone liquid defoamer). The defoamer may be present in the coolant additive in an amount up to about 1% by weight and is preferably present in an amount of about 0.001% by weight to about 0.75% by weight and more preferably in an amount of about 0.003% by weight to about 0.5% by weight, and most preferably, in an amount of about 0.005% to about 0.1% by weight of the coolant composition.

Other components such as bittering agents, dyes, tracers, or biocides may also optionally be added directly to the coolant liquid, and are generally available.

Ethylene glycol or propylene glycol is preferred as the freezing point depressant and especially the commercially available mixtures containing largely ethylene glycol and a small amount of diethylene glycol. The commercial mixture preferably contains at least about 85% to about 95% by weight of ethylene glycol with the remainder being diethylene glycol and small amounts of substances which are incidentally present such as water.

Also disclosed herein is a method for imparting corrosion inhibition to a coolant composition for use in a cooling system including iron components, wherein the corrosion inhibitor does not require periodic supplementation. The iron component can include steel alloys, cast iron alloys, and combinations of steel and cast iron alloys. An exemplary cast iron alloy component is a wet liner cylinder sleeve utilized in internal combustion engines. During use, such sleeves are exposed to elevated temperatures from friction and combustion occurring in the cylinder of the sleeve while at least a portion of the outer body of the sleeve is in contact with the engine coolant composition. The operating environment of such wet sleeves requires constant effective corrosion inhibition in the engine coolant composition. Such corrosion inhibition of wet sleeves and other iron containing components of cooling systems is obtained by the introduction of isononanoic acid, or its alkali metal, alkaline earth, or ammonium salts into the engine coolant composition in an amount effective to reduce pitting. Pitting is reduced to a level sufficient to pass engine pitting test ASTM D 7583-09 in the absence of nitrous acids and salts thereof. While wet sleeves are particularly discussed herein, the present engine coolant composition provides effective corrosion inhibition to other ferrous metal containing components, such as cast iron engine blocks, cylinder heads, and pump housings.

The following detailed examples illustrate the practice of the invention in an embodied form, thereby enabling a person of ordinary skill in the art to practice the invention. The principles of this invention, its operating parameters and other obvious modifications can be understood in view of the following detailed procedure.

TABLE 1

Iron Corrosion Inhibition Package Comparison

| Component, wt. % | Example A | Example B | Example C |
|---|---|---|---|
| Ethylene Glycol | ~90 | ~90 | ~90 |
| 50% NaOH (aq.) | 3 | 3 | 3 |
| Adipic Acid | 1 | 1 | 1 |
| Sebacic Acid | 3 | 3 | 2 |
| Isononanoic Acid | 0.45 | 0 | 0 |
| Sodium Nitrite | 0 | 0 | 0.44 |
| Other metal inhibitors and additives | <3 | <3 | <3 |
| Number of Liner Pits, Deere Engine Test (ASTM D 7583-09) | 87 | 125 | 78 |

Table 1 above sets out various coolant composition examples. Example A contains isononanoic acid for iron protection, and is used as a replacement for sodium nitrite. The isononanoic acid includes a mixture of branched chain carboxylic acids with 9 carbon atoms wherein about 88% to about 99% of mixture is 3,5,5-trimethylhexanoic acid. The ethylene glycol is included as the coolant liquid, with freeze point depressant properties. The 50% solution of sodium hydroxide in water, adipic acid, and sebacic acid contribute to providing corrosion inhibition. The isononanoic acid, and alternatively sodium nitrite, contributes to inhibiting corrosion on iron surfaces. The entry "other metal inhibitors and additives" encompass sodium tolyltriazole, sodium nitrate, sodium silicate, sodium molybdate, a dye, and a defoamer.

Example B contains neither sodium nitrite nor isononanoic acid, though it does include an alkaline dicarboxylic acid blend. Relative to Example A, the only difference in composition is the absence of isononanoic acid.

Example C includes sodium nitrite as a component, but no isononanoic acid is present.

The various examples can be produced by simple addition of the various components in an open vessel with mechanical agitation. It is recommended that the coolant liquid be introduced to the vessel first, but the order of addition of the remaining materials may vary as desired.

The three examples in Table 1 were tested according to ASTM D 7583-09, an iron engine pitting test also known as the John Deere Engine Coolant Cavitation (Pitting) Test. A formulation which passes the test will provide a test result of 200 pits or less. However, a result of 100 pits or less is desired. As shown in Table 1, the number of liner pits after running the above ASTM test using the Example A formulation containing isononanoic acid was 87, and 78 using the sodium nitrite-containing formula of Example C. Both of these test results show less than 100 pits, and would offer superior protection in the most severe service conditions. Comparatively, the Example B formula gave a 125 pit count. This result technically passes the test, though the result is well above the desired maximum of 100 pits which are typical of a system containing nitrite. As a result, the pitting protection provided by Example B would be considered suspect under hard cavitation conditions encountered in many larger, high powered diesel engines with wet sleeve liners.

TABLE 2

Coolant A Working Formulation

| Component | Wt % |
|---|---|
| Ethylene Glycol | Balance |
| 50% NaOH | 3.0 |
| Adipic Acid | 0.7 |
| Sebacic Acid | 2.8 |
| Dodecanedioic Acid | 0.1 |
| Isononanoic Acid | 0.45 |
| Sodium Molybdate Dihydrate | 0.25 |
| 50% Dipotassium Phosphate | 0.5 |
| 50% Sodium Tolyltriazole | 0.5 |
| Silbreak 320 | 0.005 |
| Plurafac LF 224 | 0.01 |

Table 2 above describes a working formula containing isononanoic acid, with additional additives such as scale inhibitors, bitterants, dye, defoamer and corrosion inhibitors, and was made according to the procedure described above. The formula shown in Table 2 would be optimized for high lead solder performance. Nonetheless, modifications of the individual component concentrations would be expected to provide acceptable results when adjusting the formula for optimized performance relative to other metals in the cooling system.

A coolant composition concentrate having the composition set out below in Table 3 was evaluated for reserve alkalinity as defined in ASTM D1121 (-11), in the presence and absence of a buffer material. The composition without buffer is the same as Example A described above in Table 1. Example D is Example A plus 0.5% 4-hydroxybenzoic acid as a buffer.

TABLE 3

Engine Coolant Test Method Composition

| | Example (% wt.) | |
|---|---|---|
| Component | A | D |
| Ethylene Glycol | ~90 | ~90 |
| 50% NaOH (aq.) | 3 | 3 |
| Adipic Acid | 1 | 1 |
| Sebacic Acid | 3 | 3 |

TABLE 3-continued

Engine Coolant Test Method Composition

| | Example (% wt.) | |
|---|---|---|
| Component | A | D |
| Isononanoic Acid | 0.45 | 0.45 |
| Other metal inhibitors and additives | <3 | <3 |
| 4-hydroxybenzoic Acid | 0.0 | 0.5 |

The procedure from ASTM D1121 (-11) for evaluating reserve alkalinity to a final pH of 5.5 was conducted. The results of this test and other physical data for these two formulas are shown in Table 4 below.

TABLE 4

Physical Properties

| | Example | |
|---|---|---|
| Property | A | D |
| Color | yellow | yellow |
| Odor | typical | typical |
| Reserve Alkalinity (ml) | 11.1 | 14.6 |
| pH | 9.14 | 10.09 |
| Freezing Point (° F.) | −35.6 | −34.5 |
| Water wt. % | 2.955 | 3.241 |

The example A and D compositions in Table 3 above were tested according to ASTM D 1384, a standard test method for engine coolants in glassware. The water used in conducting the test contained 100 ppm chlorine, 100 ppm sulfate ($SO_4$), and 100 ppm carbonate ($CO_3$). The test temperature was 190° F. (87.8° C.). The aeration rate was 10 ml ppm. The above coolant concentrates were combined with 67% corrosive water. A passing formulation requires a loss of less than 10 mg in weight for test coupons made of steel, iron brass and copper; and less than 30 mg in weight loss for aluminum and solder coupons. Both examples passed the test.

The same coolant compositions described above in Table 3 were used in a test according to ASTM D4340, which is directed to evaluating the corrosion of cast aluminum alloys in engine coolants under heat-rejecting conditions. Examples A and D above were evaluated. For a formulation to pass this test, the corrosion rate must be less than 1.0 $mg/cm^2$ per week of test time. Both examples A and D passed the test.

The data in Table 4 and the ASTM D1384 and D4340 test results show that the inclusion of the buffer component improves the reserve alkalinity while not adversely affecting the coolant composition's ability to resist corrosion.

The 50% sodium hydroxide solution identified in the formulas above is prepared by mixing equal weights of sodium hydroxide (100% active basis) and distilled or deionized water, with simple agitation, and back-addition of water to correct for lost water vapor.

While the invention has been described in conjunction with specific embodiments thereof, it is evident that many alternatives, modifications, and variations will be apparent to those skilled in the art in light of the foregoing description. Accordingly, departures may be made from such details without departing from the spirit or scope of the general inventive concept.

What is claimed:

1. An engine coolant composition comprising:
   50% or more by weight of a glycol-based coolant liquid;
   between about 0.1% by weight and about 10% by weight of a first carboxyl component selected from the group consisting of aliphatic dibasic acids or their salts having from 5 to 13 carbons, and mixtures thereof;
   between about 0.01% by weight and about 10% by weight of isononanoic acid or a salt formed therefrom;
   at least one inorganic acid or its salt as a corrosion inhibitor, selected from the group consisting of molybdates, phosphates, and combinations thereof; and
   a buffer selected from the group consisting of 2-hydroxybenzoic acid, 3-hydroxybenzoic acid, 4-hydroxybenzoic acid, 2,4-dihydroxybenzoic acid, 2,6-dihydroxybenzoic acid, and combinations thereof;
   wherein the composition excludes nitrous acid or the alkali metal, alkaline earth, or ammonium salts thereof; and the composition excludes silicates.

2. The composition of claim 1 wherein the isononanoic acid is present at a concentration between about 0.01% by weight and about 1% by weight.

3. The composition of claim 1 wherein the isononanoic acid is present at a concentration between about 0.10% by weight and about 1% by weight.

4. The composition of claim 1 wherein the isononanoic acid is present at a concentration between about 0.25% by weight and about 1% by weight.

5. The composition of claim 1 wherein the isononanoic acid is selected from the group consisting of 7-methyloctanoic acid, 6,6-dimethylheptanoic acid, 3,5,5-trimethylhexanoic acid, 3,4,5-trimethylhexanoic acid, 2,5,5-trimethylhexanoic acid, 2,2,4,4-tetramethylpentanoic acid, and combinations thereof.

6. The composition of claim 1 wherein greater than 90% of isononanoic acid is one of 7-methyloctanoic acid, 6,6-dimethylheptanoic acid, 3,5,5-trimethylhexanoic acid, 3,4,5-trimethylhexanoic acid, 2,5,5-trimethylhexanoic acid, and 2,2,4,4-tetramethylpentanoic acid.

7. The composition of claim 6 wherein greater than 95% of isononanoic acid is 3,5,5-trimethylhexanoic acid.

8. The composition of claim 1 further including an azole.

9. The composition of claim 1 wherein the first carboxyl component is adipic acid.

10. The composition of claim 1 wherein the first carboxyl component is sebacic acid.

11. The composition of claim 1 wherein the first carboxyl component is dodecanedioic acid.

12. The composition of claim 1 wherein the inorganic acid salt includes sodium molybdate.

13. The composition of claim 1 wherein the inorganic acid salt includes dipotassium phosphate.

14. A method for reducing pitting corrosion in an engine comprising incorporating into a coolant composition an amount of isononanoic acid, the salt thereof, or combinations of the acid and salt, effective to reduce pitting, at least one inorganic acid or its salt as a corrosion inhibitor, selected from the group consisting of molybdates, phosphates, and combinations thereof, and a buffer selected from the group consisting of 2-hydroxybenzoic acid, 3-hydroxybenzoic acid, 4-hydroxybenzoic acid, 2,4-dihydroxybenzoic acid, 2,6-dihydroxybenzoic acid, and combinations thereof, in the absence of nitrous acid or the alkali metal, alkaline earth, or ammonium salts thereof, and in the absence of silicates.

15. An engine coolant composition comprising:
    between about 85% by weight and about 95% by weight of a glycol-based coolant liquid;
    between about 0.1% by weight and about 6% by weight of a first carboxyl component selected from the group consisting of aliphatic dibasic acids or the alkali metal, alkaline earth, or ammonium salts thereof having from 5 to 13 carbons, and mixtures thereof;
    between about 0.01% by weight and 1% by weight of isononanoic acid or a salt formed therefrom;
    at least one inorganic acid or its salt as a corrosion inhibitor, selected from the group consisting of molybdates, phosphates, and combinations thereof; and
    a buffer selected from the group consisting of 2-hydroxybenzoic acid, 3-hydroxybenzoic acid, 4-hydroxybenzoic acid, 2,4-dihydroxybenzoic acid, 2,6-dihydroxybenzoic acid, and combinations thereof;
    wherein the composition excludes nitrous acid or the alkali metal, alkaline earth, or ammonium salts thereof; and the composition excludes silicates.

16. The composition of claim 15 wherein the first carboxylic acid is present at a concentration between about 4% by weight and about 6% by weight.

17. The composition of claim 15 wherein the isononanoic acid is present at a concentration between about 0.25% by weight and about 1% by weight.

18. The composition of claim 15 wherein the isononanoic acid is selected from the group consisting of 7-methyloctanoic acid, 6,6-dimethylheptanoic acid, 3,5,5-trimethylhexanoic acid, 3,4,5-trimethylhexanoic acid, 2,5,5-trimethylhexanoic acid, 2,2,4,4-tetramethylpentanoic acid, and combinations thereof.

19. The composition of claim 15 wherein greater than 90% of isononanoic acid is one of 7-methyloctanoic acid, 6,6-dimethylheptanoic acid, 3,5,5-trimethylhexanoic acid, 3,4,5-trimethylhexanoic acid, 2,5,5-trimethylhexanoic acid, and 2,2,4,4-tetramethylpentanoic acid.

20. The composition of claim 19 wherein greater than 95% of isononanoic acid is 3,5,5-trimethylhexanoic acid.

21. The composition of claim 15, further including an azole.

22. The composition of claim 15 wherein the first carboxyl component is adipic acid.

23. The composition of claim 15 wherein the first carboxyl component is sebacic acid.

24. The composition of claim 15 wherein the first carboxyl component is dodecanedioic acid.

25. The composition of claim 15 wherein the inorganic acid salt includes sodium molybdate.

26. The composition of claim 15 wherein the inorganic acid salt includes dipotassium phosphate.

27. The method of claim 14 further incorporating into the coolant composition a carboxyl component selected from the group consisting of aliphatic dibasic acids or their salts having from 5 to 13 carbons, and mixtures thereof.

* * * * *